United States Patent
Hasegawa et al.

(10) Patent No.: US 10,916,788 B2
(45) Date of Patent: Feb. 9, 2021

(54) HYDROGEN SUPPLY SYSTEM LOW PRESSURE STATE ESTIMATOR

(71) Applicants: Toyota Motor Engineering & Manufacturing North America, Inc., Plano, TX (US); Toyota Jidosha Kabushiki Kaisha, Toyota (JP)

(72) Inventors: Shigeki Hasegawa, Aichi (JP); Daniel Folick, Long Beach, CA (US); Jared Farnsworth, Gardena, CA (US); Motoyuki Kimata, Aichi (JP)

(73) Assignees: TOYOTA JIDOSHA KABUSHIKI KAISHA; TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 125 days.

(21) Appl. No.: 16/264,461

(22) Filed: Jan. 31, 2019

(65) Prior Publication Data
US 2020/0251760 A1    Aug. 6, 2020

(51) Int. Cl.
*H01M 8/04746* (2016.01)
*H01M 8/0438* (2016.01)
*H01M 8/04089* (2016.01)
*H01M 8/04119* (2016.01)

(52) U.S. Cl.
CPC ..... *H01M 8/04753* (2013.01); *H01M 8/0438* (2013.01); *H01M 8/04089* (2013.01); *H01M 8/04179* (2013.01); *H01M 2250/20* (2013.01)

(58) Field of Classification Search
CPC ......... H01M 8/04753; H01M 8/04089; H01M 8/0438
See application file for complete search history.

(56) References Cited

U.S. PATENT DOCUMENTS

| | | |
|---|---|---|
| 7,608,354 B2 | 10/2009 | Umayahara et al. |
| 7,785,724 B2 | 8/2010 | Bencherif et al. |
| 8,518,590 B2 | 8/2013 | Sugiura et al. |
| 8,617,757 B2 | 12/2013 | Matsusue |
| 8,722,263 B2 | 5/2014 | Cai et al. |
| 8,951,685 B2 | 2/2015 | Aso et al. |
| 9,099,701 B2 | 8/2015 | Maslyn et al. |
| 9,768,456 B1 | 9/2017 | Shim et al. |
| 9,770,999 B2 | 9/2017 | Kwon et al. |
| 9,853,313 B2 | 12/2017 | Yoshida et al. |

(Continued)

FOREIGN PATENT DOCUMENTS

GB     2533015 A    6/2016

*Primary Examiner* — Matthew J Merkling
(74) *Attorney, Agent, or Firm* — Snell & Wilmer LLP

(57) ABSTRACT

Methods, systems, and devices of a control system for gas flow. The control system controls gas flow through a fuel cell stack of a vehicle. The control system includes two or more components including one or more actuators and a fuel cell. The control system includes an electronic control unit connected to the two or more components. The control system is configured to determine initial values and previous timestep values. The control system is configured to determine or estimate a total pressure of the gas flow in each of the two or more components based on the initial values and the previous timestep values. The control system is configured to control the one or more actuators based on the total pressure of the gas flow in each of the two or more components.

20 Claims, 4 Drawing Sheets

(56) References Cited

U.S. PATENT DOCUMENTS

| | | | |
|---|---|---|---|
| 2004/0115495 A1* | 6/2004 | Asai | H01M 8/04156 |
| | | | 429/414 |
| 2004/0131900 A1* | 7/2004 | Cargnelli | H01M 8/04828 |
| | | | 429/443 |
| 2009/0280360 A1* | 11/2009 | Weingaertner | H01M 8/04798 |
| | | | 429/432 |
| 2011/0113857 A1* | 5/2011 | Sinha | H01M 8/04952 |
| | | | 73/29.02 |
| 2012/0148927 A1* | 6/2012 | Jeon, II | H01M 8/04843 |
| | | | 429/414 |
| 2013/0149628 A1 | 6/2013 | Ogawa et al. | |
| 2014/0335432 A1 | 11/2014 | Sinha et al. | |
| 2016/0172696 A1 | 6/2016 | Milacic et al. | |
| 2016/0372768 A1 | 12/2016 | Procter et al. | |
| 2018/0277863 A1* | 9/2018 | Ogawa | H01M 8/04955 |
| 2020/0044266 A1* | 2/2020 | Wang | H01M 8/04917 |

\* cited by examiner

HYDROGEN SUPPLY SYSTEM LOW PRESSURE STATE ESTIMATOR

BACKGROUND

1. Field

The present disclosure relates to systems and methods for supplying and/or controlling gas flow into a fuel cell stack of a vehicle.

2. Description of the Related Art

Vehicles, such as electric vehicles (EV), have fuel cells and other components that operate within specific operational parameters, such as temperature, gas or liquid flow rate or resistance and/or pressure. When operating within operational parameters, the vehicle operates at peak efficiency and the components of the vehicle operate within hardware limitations so as not to damage the components and/or operate inefficiently when generating electrical energy.

Conventionally, within a fuel cell system of a vehicle, the fuel cell system has a legacy controller that estimates an amount, a rate or ratio of a gas or water vapor or other parameter, such as pressure, at a single point near the component to be controlled, such as the outlet of the fuel cell stack of the fuel cell system. The fuel cell system controls the amount, the rate or the ratio of the gas or the water vapor, or other parameter at the single point based on the estimation at the single point near the component to be controlled. These singular calculations are component and parameter specific and do not account for the state of other components within the fuel cell system. This may result in estimations with a significant amount of variability and/or inaccuracies. For example, the fuel cell system may estimate the amount of gas at the outlet of the fuel cell and control the fuel cell based on the estimated amount of gas. This, however, does not account for gas that permeates in other components that interconnect with the fuel cell, and thus, the estimation only provides a rough component-specific estimation. Moreover, since the estimation is component-specific, the fuel cell system is unable to determine the amount of water or other gases within the other components without additional hardware sensors.

Accordingly, there is a need for a system, apparatus and/or method to determine or predict various parameters, such as liquid water, water vapor, hydrogen gas and/or non-hydrogen gas at each component interconnected with the fuel cell.

SUMMARY

In general, one aspect of the subject matter described in this specification is embodied in a control system. The control system controls gas flow through a fuel cell stack of a vehicle. The control system includes two or more components including one or more actuators and a fuel cell. The control system includes an electronic control unit connected to the two or more components. The control system is configured to determine initial values and previous timestep values. The control system is configured to determine or estimate a total pressure of the gas flow in each of the two or more components based on the initial values and the previous timestep values. The control system is configured to control the one or more actuators based on the total pressure of the gas flow in each of the two or more components.

These and other embodiments may optionally include one or more of the following features. The gas may be a composition of hydrogen gas, water and non-hydrogen gas and the initial values and the previous timestep values are of flowrates, pressures, concentrations, temperatures and liquid water quantity. The control system may include an injector, a hydrogen pump or a purge valve. The injector may control an amount or rate of hydrogen gas injected into the fuel cell. The hydrogen pump may control the amount or the rate of the hydrogen gas that is recirculated into the fuel cell. The purge valve may control an amount or rate of non-hydrogen gas exhausted from the vehicle.

The electronic control unit may be configured to determine or estimate a partial pressure of each element of the gas flow in each of the two or more components based on the total pressure of the gas flow in each of the two or more components. The electronic control unit may be configured to determine a ratio of the amount of hydrogen gas to an amount of hydrogen gas consumed and may adjust a speed of the hydrogen pump based on the ratio. The electronic control unit may adjust a position of the purge valve to release at least one of water or non-hydrogen gas based on the speed of the hydrogen pump. The electronic control unit may be configured to adjust at least one of the injector, the hydrogen pump or the purge valve to maintain a ratio of moles of hydrogen gas ($H_2$) to mole hydrogen consumed at the fuel cell stack of approximately $(1+\alpha):1$ where $0<\alpha<1.5$ at a constant pressure. The electronic control unit may adjust a position of the injector to allow an amount of hydrogen gas into the fuel cell that is greater or equal to an amount of hydrogen gas consumed by the fuel cell to generate electrical energy based on a constant pressure at an outlet of the fuel cell and a ratio.

The electronic control unit may be configured to determine a water balance for the two or more components. The electronic control unit may be configured to control the one or more actuators based on the water balance.

In another aspect, the subject matter is embodied in a method for gas flow within a fuel cell. The method includes obtaining initial values and previous timestep values of flowrates, pressures, concentrations, temperatures and liquid water quantity at each component of multiple components. The method includes determining a total pressure for each component of the multiple components based on the initial values and the previous timestep values. The method includes determining a partial pressure for each element within the gas flow for each component of the multiple components based on the total pressure for each component. The method includes controlling at least one of an injector, a purge valve or a hydrogen pump based on the total pressure and partial pressure for each component.

In another aspect, the subject matter is embodied in a control system for controlling a gas flow within a fuel cell stack of a vehicle. The control system includes two or more fuel cell components including one or more actuators and a fuel cell. The control system includes an electronic control unit connected to the two or more fuel cell components. The electronic control unit is configured to determine initial values and previous values of flowrates, pressures, concentrations, temperatures and liquid water quantity of each component of the two or more components. The electronic control unit is configured to determine a total pressure for each component based on the initial values and the previous values. The electronic control unit is configured to determine a partial pressure of each component based on the total pressure. The electronic control unit is configured to determine a temperature of each component and a water balance of each component. The electronic control unit is configured to control the one or more actuators based on the total pressure, the partial pressure, the temperature and the water balance.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Disclosed herein are systems, vehicles and methods for estimating the gas flow through one or more components of the fuel cell stack. The control system estimates various characteristics of the gas at each of the one or more components interconnected with the fuel cell.

The various characteristics include a total pressure, a flow resistance, an amount or rate of flow, a temperature and/or one or more partial pressures and/or partial amounts of the gas. The one or more components that provide the gas may include one or more interconnecting pipes, one or more actuators, such as a hydrogen pump, a purge valve or an injector, and/or one or more manifolds. The one or more components may include the fuel cell or may be interconnected with and separate from the fuel cell. Similarly, the one or more components may include the one or more actuators or may be interconnected and separate from the one or more actuators. By estimating the various characteristics, the control system models the flow of gases into and out of the fuel cell and the one or more components in real-time. This allows for a more accurate model predicated on estimations at each of the one or more components and not a single point estimation. Moreover, the control system maintains the conservation of mass throughout the estimations to provide for a more accurate estimation.

Other benefits and advantages include the capability to control the ratio of gas and/or non-hydrogen gas into and out of the fuel cell. The one or more components provide an amount or volume of gas or liquid into and out of the fuel cell stack to maintain a ratio of hydrogen gas to non-hydrogen gas within the fuel cell stack at a constant pressure. The control system estimates the various characteristics and controls one or more actuators to maintain the ratio based on the estimations. By maintaining the ratio of hydrogen gas to non-hydrogen gas or hydrogen gas consumed, the fuel cell stack more efficiently provides for electrical generation.

Additionally, the calculation(s) of the estimations are done in real-time, and thus, the control system may more quickly adjust to present conditions, since the various characteristics within the one or more components are constantly changing.

Figure 1:
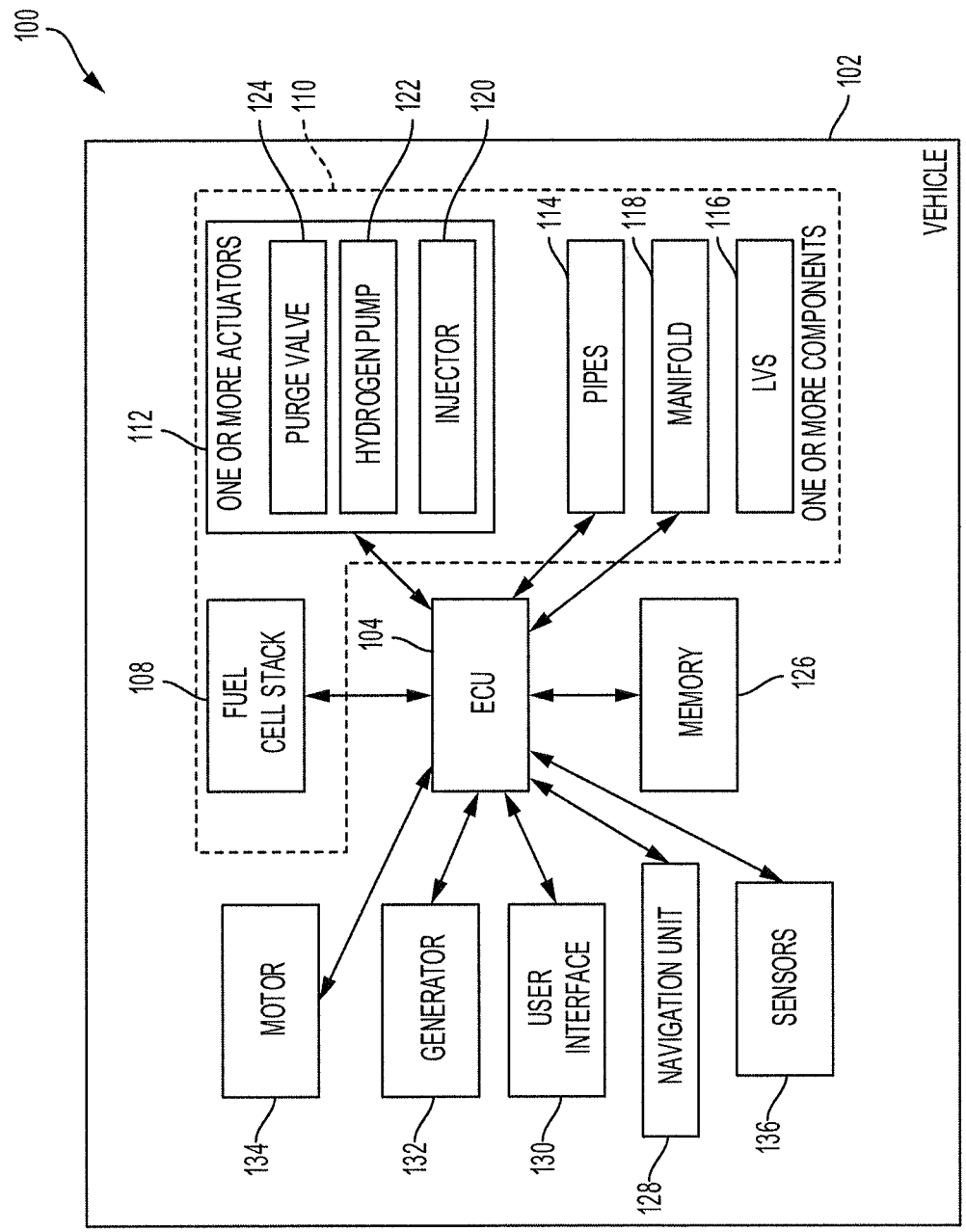
FIG. 1 is a block diagram of a hydrogen supply and flow control system ("control system) that controls the flow of a gas into and out of the fuel cell stack of a vehicle according to an aspect of the invention.

FIG. 1 shows a hydrogen supply and flow control system ("control system") 100 that controls the flow of one or more gases into and out of the fuel cell stack 108. The gas may be hydrogen gas or a non-hydrogen gas, such as nitrogen, water and/or water vapor and/or a combination thereof. The liquid may be water. The control system 100 controls the flow of the gas to maintain a ratio of hydrogen gas to hydrogen gas consumed by the fuel cell stack to operate the fuel stack more efficiently.

The control system 100 may be included, integrated, embedded, retrofitted or otherwise connected within the vehicle 102. The control system 100 provides control over the gas flow within the vehicle 102 to manage, regulate and/or control temperature, pressure, flow rates and other parameters within components of the vehicle 102. The control system 100 includes a processor, such as an electronic control unit (ECU) 104, a memory 126 and/or one or more sensors 136, and one or more components 110. The control system 100 may include a user interface 130.

The control system 100 estimates, predicts and/or determines various parameters, such as the temperature, the flow resistance or rate, and/or the pressure within the one or more components 110, such as the fuel cell stack 108, the one or more actuators 112, one or more pipes 114, the liquid vapor separator 116 or other components.

The control system 100 includes one or more processors, such as an electronic control unit (ECU) 104. The ECU 104 may be implemented as a single ECU or as multiple ECUs. The ECU 104 may be electrically coupled to some or all of the components of the vehicle 102, such as the generator 132 and/or the motor 134. The ECU 104 may include one or more processors or controllers specifically designed for controlling the one or more actuators 112 and/or obtaining data from the one or more sensors 136 to control or adjust the one or more actuators 112 to meet various targets, e.g., for speed, pressure, flow rate or resistance and/or temperature, for the gas or liquid within the one or more components 110. The ECU 104 may be coupled to a memory 126 and execute instructions that are stored in the memory 126.

The memory 126 may be coupled to the ECU 104 and store instructions that the ECU 104 executes. The memory 126 may include one or more of a Random Access Memory (RAM) or other volatile or non-volatile memory. The memory 126 may be a non-transitory memory or a data storage device, such as a hard disk drive, a solid-state disk drive, a hybrid disk drive, or other appropriate data storage, and may further store machine-readable instructions, which may be loaded and executed by the ECU 104.

The control system 100 may include a user interface 130. The control system 100 may display one or more notifications on the user interface 130 that indicate initialization of the control system 100 or an adjustment by the control system 100 when managing and/or controlling the gas or liquid flow. The control system 100 may display the actual or estimated temperature, the flow resistance, rate or amount, and/or the pressure of the gas flowing through the one or more components 110.

The control system 100 may include one or more sensors 136 that measure or determine the value of various boundary conditions of the one or more components within the control system 100. The one or more sensors 136 may include a temperature sensor that measures an ambient temperature of the gas or liquid at the outlet of the injector 120, an outlet of the fuel cell stack 108, or an outlet of the hydrogen exhaust valve (or "purge valve") 124, for example. In another example, the one or more sensors 136 may include a pressure sensor that measures the ambient pressure of the gas at the outlet of the injector 120, an outlet of the fuel cell stack 108 or an outlet of the purge valve 124. In another example, the one or more sensors 136 may include a speed sensor that measures the speed of the hydrogen pump 122.

Figure 2:
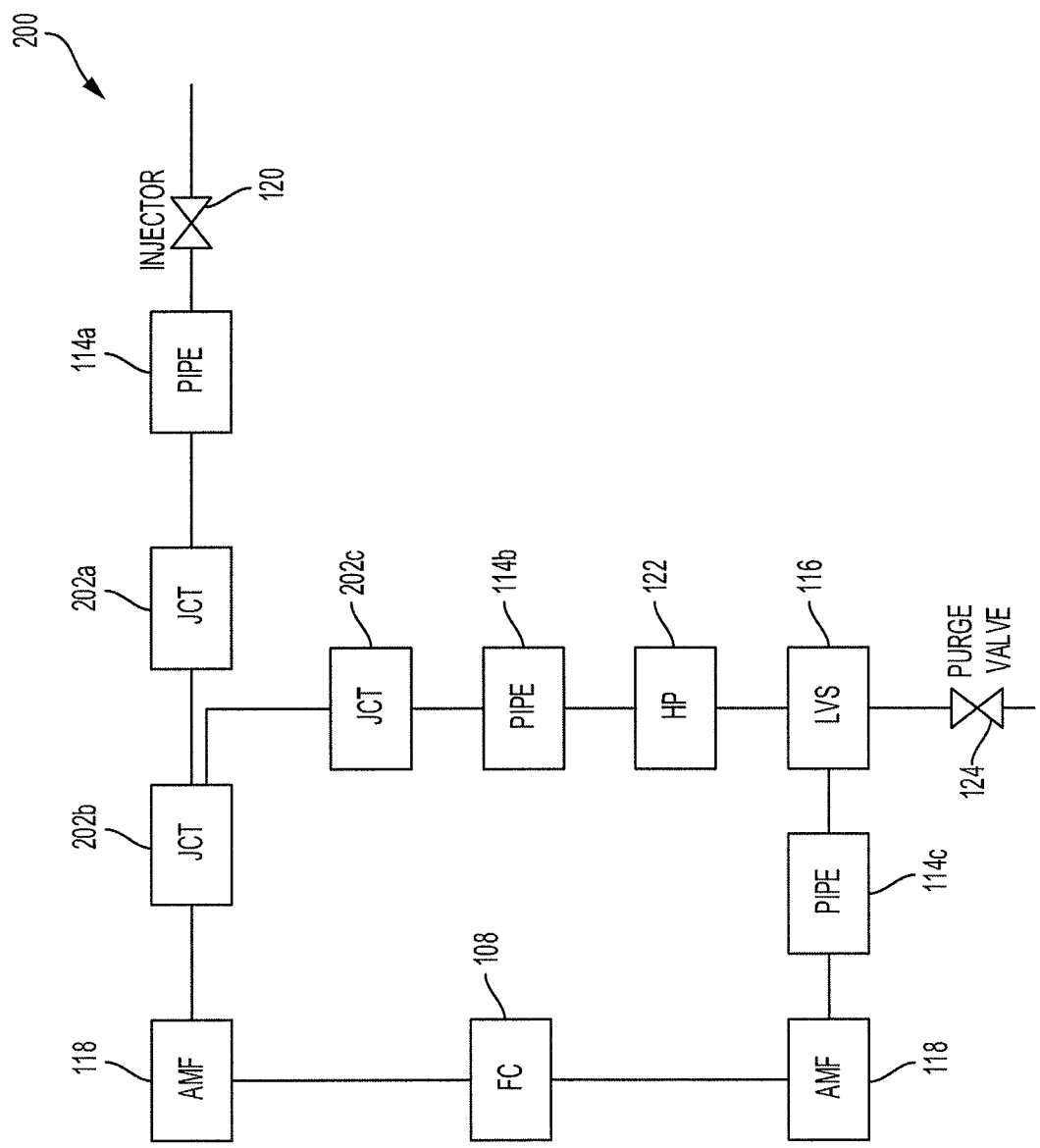
FIG. 2 is a schematic diagram of the interconnection among the one or more components of the control system of FIG. 1 according to an aspect of the invention.

The control system 100 includes one or more components 110. The one or more components may 110 include the fuel cell stack 108, one or more actuators 112, one or more pipes 114, a liquid vapor separator (LVS) 116 and/or one or more fuel cell stack inlet/outlet manifolds 118. The one or more actuators 112 may include an injector 120, or other open and close device that injects or allows hydrogen gas into the one or more components 110. The one or more pipes 114 may interconnect the various components, such as the fuel cell stack 108, the one or more actuators 112, they hydrogen pump (HP), the LVS 116 and/or the one or more fuel cell stack inlet/outlet manifolds 118 to deliver the gas flow to the one or more components 110. FIG. 2 shows the interconnection of the one or more components 110 including the fuel cell stack 108 with the one or more actuators 112 through the one or more pipes 114.

The one or more components 110 may include the fuel cell stack 108 has multiple fuel cells. The fuel cells convert chemical energy from a fuel, such as hydrogen gas, into electricity through an electrochemical reaction of hydrogen gas with oxygen or another oxidizing agent. The fuel cells require a continuous source of fuel and oxygen to sustain the chemical reaction to produce electricity continuously for as long as fuel and oxygen are supplied.

The one or more components 110 may include an LVS 116. The LVS 116 separates a vapor-liquid mixture, such as the water from the gas, which is flowing throughout the one or more components 110. The LVS 116 separates the water from the gas stream so that that the purge valve 124 may purge the excess water out the exhaust.

The one or more components 110 may include one or more fuel cell stack inlet/outlet manifolds 118. The one or more fuel cell stack inlet/outlet manifolds 118 distribute air throughout the vehicle 102. The air includes oxygen needed by the generator 132, motor 134 and/or the fuel cell stack 108 to chemically react with the hydrogen and produce electrical energy.

The one or more actuators 112 may be connected to the ECU 104. The ECU 104 may adjust, monitor, manage or otherwise control the one or more actuators 112. The one or more actuators may include an injector 120, a hydrogen pump 122 and/or a purge valve 124.

The injector 120 may be a natural-gas injector with a solenoid valve control or other open and close device, for example. The ECU 104 positions the injector 120 to control the flow of gas into the one or more other components 110 including the fuel cell stack 108. The ECU 104 may open, partially open, close and/or otherwise position the injector 120 to control the quantity or amount of hydrogen gas injected by the injector 120. The injector 120 injects the hydrogen gas to meet a total pressure target for the inlet of the fuel cell stack 108 and maintain a ratio of hydrogen gas to non-hydrogen gas. The total pressure target for the inlet of the fuel cell stack 108 is a function of the amount of hydrogen gas the fuel cells need and the amount of pressure required at the outlet of the fuel cell stack 108 and the amount of non-hydrogen gas within the fuel cell stack 108. For example, the amount of hydrogen gas injected into the fuel cell stack 108 may be greater than or equal to the amount of hydrogen gas consumed to produce electrical energy, such that there is at least approximately a 1:1 ratio of hydrogen gas inputted to hydrogen gas consumed with a constant pressure at the outlet of the fuel cell stack 108.

The hydrogen pump 122 may be a pump, compressor or other blower that moves the hydrogen gas throughout the one or more components 110 interconnected with the fuel cell stack 108. The hydrogen pump 122 recirculates the hydrogen gas back to the fuel cell stack 108 to maintain the ratio of hydrogen gas to mole of hydrogen consumed at the fuel cell stack of approximately $(1+\alpha):1$ where $0<\alpha<1.5$ (hereinafter, referred to as "the ratio"). To account for other variables, the ECU 104 may use the hydrogen pump 122 to pump enough hydrogen gas to maintain the ratio. By increasing the speed of the hydrogen pump 122 more hydrogen gas is pumped or recirculated into the fuel cell stack 108 to increase the ratio of hydrogen gas to non-hydrogen gas.

The purge valve 124 exhausts or releases water accumulated within the one or more components 110 and separated by the LVS 116. The ECU 104 may position the purge valve 124 into an open, a close, and/or a partially open position to release an amount or quantity of water that has accumulated within the LVS 116. Moreover, the ECU 104 causes the purge valve 124 to release or exhaust the water and/or other non-hydrogen gas to control the amount of non-hydrogen gas within the one or more components. This assists the control system 100 in maintaining a stoichiometry of approximately $(1+\alpha)$ moles of hydrogen gas where $0<\alpha<1.5$ for every 1 mole of hydrogen gas consumed by the fuel cell stack.

The control system 100 is connected to, retrofitted in and/or included in a vehicle 102. A vehicle 102 is a conveyance capable of transporting a person, an object, or a permanently or temporarily affixed apparatus. The vehicle 102 may be a self-propelled wheeled conveyance, such as a car, sports utility vehicle, truck, bus, van or other motor or battery driven or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack 108, a motor 134 and/or a generator 132. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors 136 and/or a navigation unit 128 to drive autonomously.

The vehicle 102 may include a motor 134 and/or a generator 132. The motor 134 and/or generator 132 may be an electric motor and an electric generator that converts electrical energy into mechanical power, such as torque, and converts mechanical power into electrical energy. The vehicle 102 may include a navigation unit 128 that obtains navigational map information and/or vehicle information to autonomously navigate the vehicle 102 and/or display to the user through the user interface 130. The navigational map information may include a map that identifies roadways, terrains and other points of interest to navigate the vehicle 102. The navigational map information may include route information that includes a starting point, a destination point and a path of travel from the starting point to the destination point for the vehicle 102. The vehicle information may include a current location of the vehicle 102, a current direction of travel of the vehicle 102 and/or a current speed of the vehicle 102.

FIG. 2 shows the interconnection of the one or more actuators 112 with the other components of the one or more components 110 through the various interconnected pipes 114. The ECU 104 may be electrically coupled to and provide instructions to the one or more actuators 112.

The one or more pipes 114 interconnect to form one or more pipe junctions 202a-c and connect one or more actuators 112 with the other components 110 including the fuel cell stack 108. The one or more pipe junctions 202a-c are where a single pipe branches off into multiple pipes or where multiple pipes unite to form a single pipe. A pipe junction 202a-c may also be referred to as a pipe split. A pipe may split or branch off into any number of pipes. The pipes that have split or branched off from the original pipe may run in parallel and may have the same pressure drop across parallel running pipes.

The one or more pipes 114 allow the gas to flow through to the other components 110. For example, the injector 120 is connected to and injects the gas to the fuel cell stack inlet/outlet manifold 118 through the pipe 114 a and the one or more pipe junctions 202a-b. The fuel cell stack inlet/outlet manifold 118 passes the air and gas to the fuel cell stack 108 where the hydrogen gas reacts with the oxygen to form electrical energy. The fuel cell stack 108 exhausts and/or emits a gas stream including water and/or water vapor as a byproduct of the chemical reaction to form the electrical energy. The gas stream passes through the fuel cell stack inlet/outlet manifold 118 and one or more pipes 114c to the LVS 116. The LVS 116 separates the water and/or water vapor from the gas stream and the purge valve 124 purges the water and/or water vapor out the exhaust. The hydrogen pump 122 recirculates the gas stream including any remaining hydrogen gas through the one or more pipes 114b and/or the one or more pipe junctions 202b-c to the fuel cell stack 108.

The ECU 104 may estimate, predict or model parameters, such as the temperature, flow resistance or pressure at the at the one or more components 110 including the one or more pipe junctions 202a-c, the one or more actuators 112, the one or more pipes 114 or the other components. The ECU 104 controls the amount or rate of gas flow through the one or more components 110 to adjust the amount or rate of hydrogen gas into the fuel cell stack 108 and/or the ratio of hydrogen to non-hydrogen into the fuel cell stack 108 based on the estimated, predicted or modelled parameters.

Figure 3:
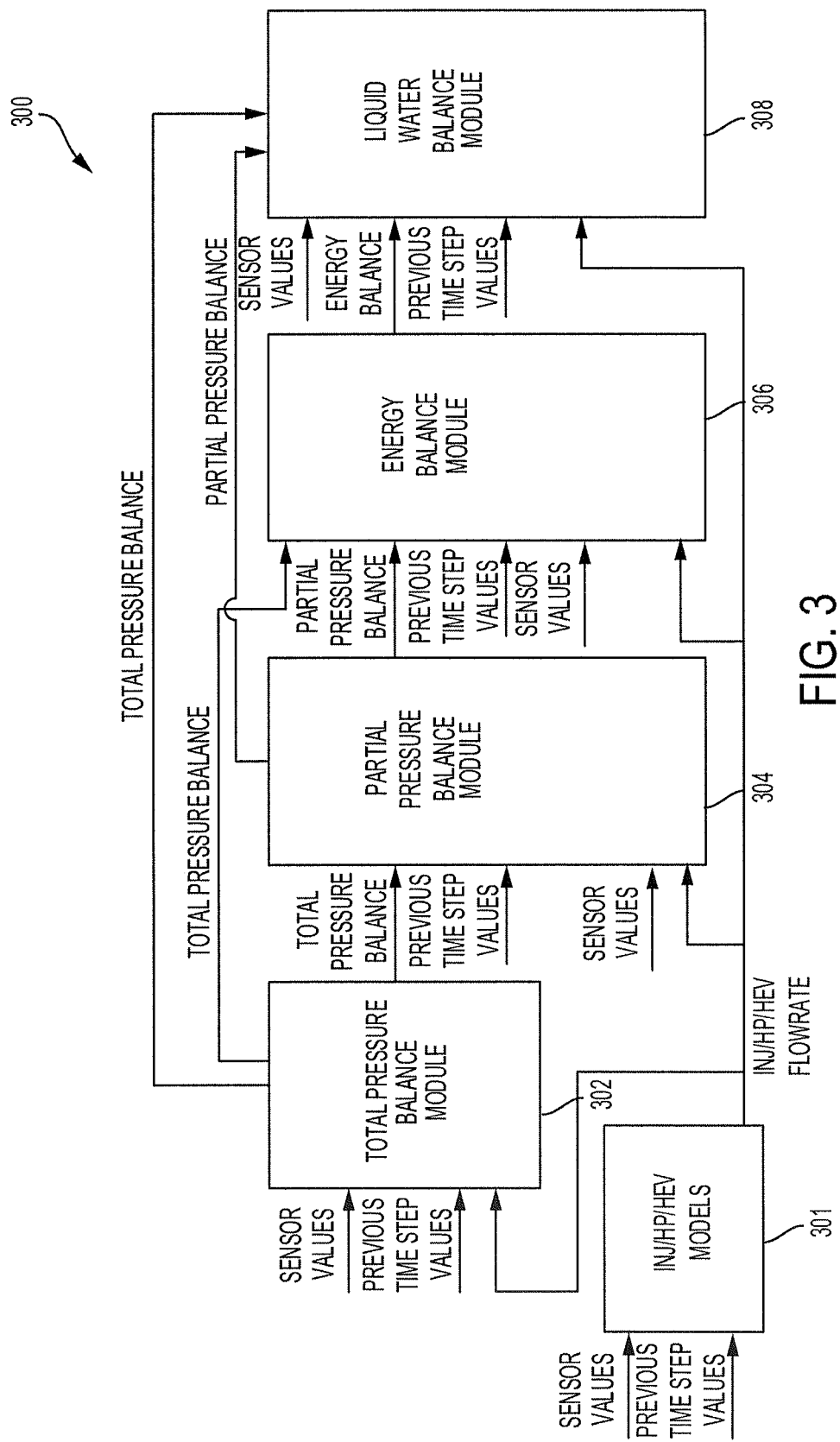
FIG. 3 is a schematic diagram of cascading modules to determine various parameters of the components of the control system of FIG. 1 according to an aspect of the invention.

FIG. 3 is a schematic diagram of modules to determine the total pressure balance, the partial pressure balance, the energy balance and the liquid water balance within the components 110 of the control system 100 of FIG. 1. The control system 100 uses sensor values and previous timestep values along with the injector, hydrogen pump and hydrogen exhaust valve models 301 to determine the injector, hydrogen pump and/or hydrogen exhaust valve flowrate. Then, the control system 100 uses the sensor values and previous timestep values of various parameters including temperature, an amount or rate of gas flow, pressure and the injector, hydrogen pump and hydrogen exhaust valve flowrate to determine the total pressure balance for each component 110 within the total pressure balance module 302. The control system 100 uses the total pressure balance for each component 110 and the previous timestep values of the various parameters as inputs to determine the partial pressure balance for each component 110 within the partial pressure balance module 304. In order to determine the energy balance for each component 110 within the energy balance module 306 and the corresponding temperature at each component 110, the control system 100 uses the total pressure balance and the partial pressure balance for each component 110 and the previous timestep values of the various parameters as an input. Moreover, the control system 100 uses the energy balance, the partial pressure balance and the total pressure balance for each component 110 along with the previous timestep values of the various parameters to determine the liquid water balance within the liquid balance module 308 to specify the amount of liquid water or water vapor.

Figure 4:
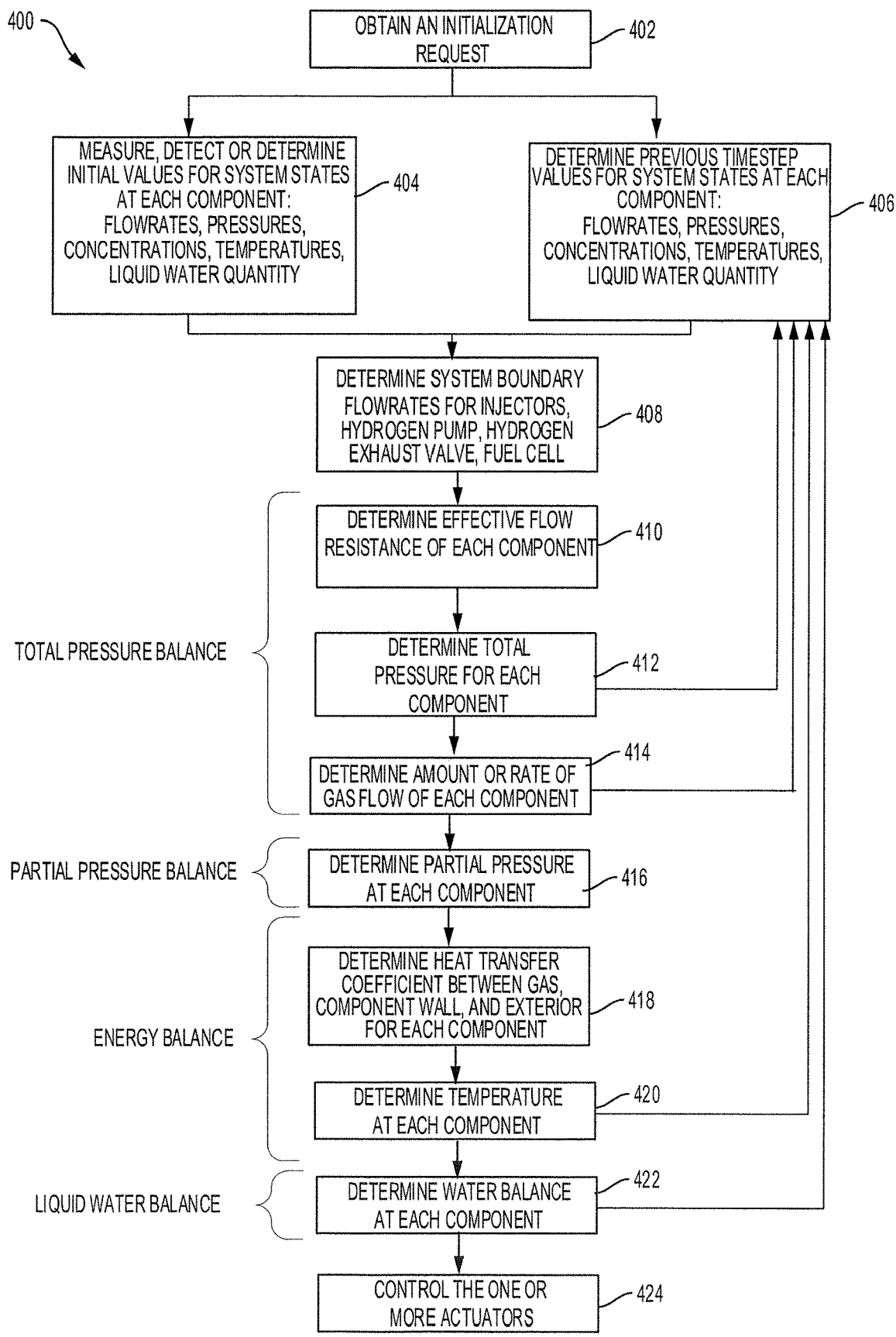
FIG. 4 is a flow diagram of an example process for controlling the one or more actuators to maintain a ratio of hydrogen gas to hydrogen gas consumed within the fuel cell stack according to an aspect of the invention.

FIG. 4 is a flow diagram of a process 400 for controlling the one or more actuators 112. The control system 100 uses the total pressure balance to control the one or more actuators 112 to adjust the amount or rate of hydrogen gas and/or the ratio of hydrogen gas to hydrogen gas consumed in the fuel cell stack 108. One or more computers or one or more data processing apparatuses, for example, the one or more processors, such as the ECU 104, may implement the process 400.

The control system 100 obtains an initialization request (402). The initialization request initiates or makes operational the control system 100. The control system 100 may receive the initialization request when a user activates the control system 100, e.g., when the vehicle 102 is powered on. The control system 100 may receive the initialization request from one or more sensors 136. For example, when the fuel cell electric vehicle (FCEV) is turned on, a fuel cell sensor may detect that the vehicle 102 is in operation and send the initialization request to the control system 100.

In response to obtaining the initialization request, the control system 100 measures, detects, or otherwise determines initial values for the flowrates, pressures, concentrations, temperatures and liquid water quantity at each component (404). The control system 100 may use one or more sensors 136, such as a pressure sensor, positioned at, near and/or immediately downstream of the outlet of the injector 120 to measure the initial pressure of the gas into the one or more other components 110, such as the pipe 114a, as shown in FIG. 2 for example. Other sensors of the one or more sensors 136 may measure, detect or otherwise determine the initial values of the flowrates, concentrations, temperatures and/or liquid quantity at each of the one or more components.

For example, the control system 100 may obtain an initial temperature of the gas, $T_{amb}^{IN}$, using a sensor to detect the initial temperature or may use a pre-determined ambient temperature of the gas as the initial temperature. In some implementations, the initial values of the flowrates, concentrations, temperatures and/or liquid quantity at a component is pre-configured, pre-determined or otherwise set during initialization of the control system 100.

The control system 100 determines previous timestep values for the flowrates, pressures, concentrations, temperatures, and/or liquid water quantity (406). Output values of the flowrates, pressures, concentration, temperatures and/or liquid water quantity of each component are fed as input values or previous timestep values for a subsequent component.

The control system 100 estimates or determines the flowrates at the control system 100 boundary for the injector 120, the hydrogen pump 122, the purge valve 124 and/or the fuel cell stack 108 (408). The flowrates may be based on the initial values and/or the previous timestep values. For example, an initial amount or rate of gas flow from the injector 120 into the other components 110, such as the pipe 114a, is based on the initial pressure at the outlet of the injector 120 and/or the initial temperature. The control system 100 may calculate the initial amount or rate of gas flow, $\dot{n}_{gas}^{IN}$, based on the initial pressure, the temperature, a duty cycle and/or a model of the injector 120, which provides an estimate of the amount or rate of gas flow exiting the injector 120 into the pipe 114a, for example. The duty cycle is the amount of time that the injector 120 is on or energized during an engine cycle.

Similarly, the control system 100 may determine or estimate the amount or rate of gas flow out the purge valve 124, $\dot{n}_{gas}^{SV}$, and at the outlet of the fuel cell stack 108, $\dot{n}_{gas}^{FC}$, over time. Hydrogen gas, non-hydrogen gas, water and/or other mass of a gas leaves or enters the purge valve 124, the fuel cell stack 108 and/or the injector 120, and as such, the control system 100 measures, detects or otherwise measures an initial pressure of gas exiting the injector 120, the purge valve 124, the outlet of the fuel cell stack 108 or other component 110 that is a boundary condition to determine or estimate the amount or rate of gas flow to the other components 110.

The control system 100 determines, calculates or solves for the effective flow resistance, $K_{d\_eff}$, of each component (410). The effective flow resistance may be a function of the flow resistance through a portion (or half) of a first component, $K_{d+}^K$, and the flow resistance through a portion (or half) of a second component, $K_{d-}^{K+1}$, that is downstream from the first component. That is, the effective flow resistance is the inverse summation of the flow resistance of the two portions of the different components and may be defined by the following equation:

$$K_{d\_eff}^{K/(K+1)} = \frac{1}{\left(\frac{1}{K_{d+}^K} + \frac{1}{K_{d-}^{K+1}}\right)}.$$

The flow resistance for each portion (or half) may be calculated using the Reynold's number (Re) and the friction factor, $f_D$. The Reynold's number is a quantity in fluid dynamics that assists in predicting flow patterns in different fluid flow situations. The friction factor is a function of the Reynold's number. The control system 100 determines the friction factor using the Darcy-Weisbach formula where Roughness corresponds to a roughness of the material of the component and is a known property of the component and D is the diameter of the component. The ECU 104 may calculate the friction factor using the following equation:

$$f_D = \frac{1}{\left[-\frac{1.8}{2.303}\log_{10}\left(\frac{6.9}{Re} + \left(\frac{\text{Roughness}}{3.7D}\right)^{1.11}\right)\right]^2}.$$

The control system 100 determines or estimates a total pressure for each component including subsequent or downstream components 110 that the gas flows into, such as the pipe junction 202a, as shown in FIG. 2 for example (412). A subsequent or downstream component may refer to a component that receives the gas stream from a current component. A previous or upstream component provides the gas stream to the current component, which provides the gas stream to the downstream component.

Since, the volume, V, of the one or more components 110 is constant, the pressure, P, is a function of the number of moles, n, the universal gas constant, R, and the temperature, T. That is, PV=nRT. As the number of moles decreases as the gas exits the component, the amount of pressure and/or temperature decreases, and as the number of moles of increases as the gas enters the component, the pressure and/or the temperature increase. Similarly, as the amount of pressure increases, the number of moles and/or the temperature increases, and as the amount of pressure decreases, the number of moles and/or the temperature decreases. Therefore, a change in total pressure between two interconnected components may similarly correspond to a change in the amount or rate of gas flow between two interconnected components. The control system 100 may calculate the total pressure of the component and determine the amount or rate of gas flow of each component (414).

The change in the amount or rate of gas flow, $\dot{n}_{net}$, is a function of the gas flow into the component, $\dot{n}_{in}$, the gas flow out of the component, $\Delta \dot{n}_{liquid}$. That is, $\dot{n}_{net}=\dot{n}_{in}-\dot{n}_{out}-\Delta \dot{n}_{liquid}$. Moreover, the control system 100 may define the change in the amount or rate of the gas flow implicitly, since the change in the squared amount or rate of the gas flow is a function of the change in pressure and the flow resistance. This equation can be written as $$\Delta P = F_d \frac{L}{D} \frac{\rho v^2}{2}$$

where $F_d$ is the darcy friction factor and v is the fluid velocity. This equation can be linearized through use of an effective flow resistance term, $K_{d\_eff}$. That is, $\dot{n}_{now}=\Delta P*K_{d\_eff}$. And thus, since $\Delta P$ is the difference in pressure between two components, the change in the amount or rate of gas flow may be defined by the following equation, where the notation K, K−1 and K+1 represent the component, the upstream component and the downstream component, respectively:

$$\dot{n}_{net} = \frac{V}{RT_{old}} * \frac{P^K - P_{old}^K}{dt} =$$
$$(P^K - P^{K-1})K_{d\_eff\_old}^{K/(K-1)} - (P^K - P^{K+1})K_{d\_eff\_old}^{K/K+1} - \Delta \dot{n}_{liquid}.$$

Given the linear set of equations for the above relationship for each component, the control system 100 may determine the amount or rate of gas flow implicitly and the total pressure for each component at a particular time by solving a matrix of the above equations for each component, for example.

By using determined or estimated parameters, such as total pressure, temperature and/or the amount or rate of the gas flow, from upstream components, the control system 100 is able to determine the parameters of a downstream component in real-time. This allows the control system 100 to use more accurate and precise values in modelling the one or more components 110 interconnected with the fuel cell stack 108. This repeats for each of the one or more components 110. That is, at each of the one or more components 110, the control system 100 recursively determines or estimates a total pressure and amount or rate of gas flow for the component using the previous parameters, such as the total pressure, temperature and/or the amount or rate of the gas flow.

The control system 100 calculates or determines the partial pressure of each element at each component (416). The control system 100 determines the partial pressure balance for each element, such as hydrogen gas, $P_{H2}$, non-hydrogen gas, $P_{N2}$, and/or water, $P_{H20}$ for each component of the one or more components 110. The control system 100 uses the partial pressure balance to control the one or more actuators 112 to adjust the amount or rate of hydrogen gas and/or the ratio of hydrogen gas to hydrogen consumed in the fuel cell stack 108.

Similarly, as described above to determine the total pressure balance, the control system 100 obtains initial values including an initial partial pressure for one element, such as the non-hydrogen gas (e.g., nitrogen) and/or water. The initial partial pressure may be a measured ambient pressure or a pre-determined ambient pressure. For example, since ambient air is a mixture of approximately 70% nitrogen the pressure of nitrogen is approximately 70% of the ambient pressure. In another example, the control system 100 assumes the initial pressure of water may be approximately 0% or other small amount that assumes the ambient air is dry. In some implementations, the control system 100 may use one or more sensors 136, such as a pressure sensor, positioned at, near and/or immediately downstream of the outlet of the injector 120 to measure the initial pressure of the non-hydrogen gas into the one or more other components 110, such as the pipe 114a, as shown in FIG. 2 for example.

Since the sum of the partial pressure balance for each element of the component is equivalent to the total pressure balance of the component, e.g., $P_{total}=P_{H2}+P_{N2}+P_{H20}$, the amount or rate of the gas flow of the one element is a molar fraction of the total amount or rate of gas flow in the component, and thus, the control system 100 may implicitly define the amount or rate of gas flow of the element. For example, the amount or rate of the gas flow of nitrogen may be represented as, $\dot{n}_{N\_2}=\dot{n}_{total}*X_{N\_2}$, where $$X_{N\_2} = \frac{P_{N\_2}^K}{P_{total}^K}.$$

The control system 100 determines or estimates a partial pressure for an element for each component 110. The control system 100 determines or estimates the partial pressure for the element based on previous timestep values including the initial values. The control system 100 may represent the change in the amount or rate of the gas flow of the element as $$\dot{n}_{net} = \frac{V}{RT_{old}} * (P_{ele}^K - P_{ele\_old}^K) = \dot{n}_{in}^K * \frac{P_{ele}^K}{P_{total}^K} - \dot{n}_{out}^K * \frac{P_{ele}^{K+1}}{P_{total}^{K+1}}.$$

The control system 100 may define a linear set of equations for the above relationship for the element for each component, and may solve a matrix of equations to determine the amount or rate of gas flow for the element implicitly and the partial pressure for the element for each component at a particular time, for example.

The above-mentioned process may repeat for the other remaining elements. In some implementations, in order to maintain the conservation of mass, the control system 100 may determine the partial pressures for the all the elements, e.g., the non-hydrogen gas, such as the nitrogen, and the water implicitly, except one, such as the hydrogen gas. Then, determine the partial pressure for the last element, such as the hydrogen gas, $P_{H2}$, based on the implicit determinations and/or estimations of the other elements, such as the non-hydrogen gas and water. Since all the partial pressures add up to the total pressure, e.g., $P_{total}=P_{H2}+P_{N2}+P_{H20}$, the partial pressure for the hydrogen gas may be calculated as the difference between the total pressure within the component and the partial pressures of the non-hydrogen gas and water, i.e., $P_{H2}=P_{total}-P_{N2}-P_{H20}$ or $P_{H2}=P_{total}*X_{H2}$; $P_{N2}=P_{total}*X_{N2}$; $P_{H20}=P_{total}*X_{H20}$. This allows the control system 100 to maintain conservation of mass in the estimations or determinations throughout all of the one or more components 110. The control system 100 may determine the amount or rate of flow of the last element based on the partial pressure for the last element.

The control system 100 determines the heat transfer coefficient between the gas, the component wall and the exterior for each component 110 (418). In order to determine the heat exchange of the gas, the control system 100 divides each component 110, such as a pipe 114a, into two portions and determines the effective heat exchange of the gas in the two portions, $h_{gas-}^K$ and $h_{gas+}^K$. The effective heat exchange of the gas for a first portion is equivalent to $$h_{gas-}^K = \frac{Nu_-^K K_{gas}^K}{D_{in}^K},$$

where, $Nu_-^K$, is the nusselt number, $K_{gas}^K$, is the thermal conductivity of the gas and $D_{in}^K$ is the diameter of the inlet. Similarly, a second portion is equivalent to $$h_{gas+}^K = \frac{Nu_+^K K_{gas}^K}{D_{in}^K}.$$

Then, the control system 100 determines the heat exchange, $\Delta q_{ex}^K$, within each portion of the component, e.g., the amount of energy entering or leaving the component through the wall. The control system 100 divides the component into two portions and determines the effective heat exchange for both portions, $h_{eff-}$ and $h_{eff+}$. That is $$h_{eff-} = \frac{1}{\frac{1}{h_{ext}} + \frac{T_{solid}^K}{K_{solid}^K} * \frac{A_{out}^K}{A_{ave}^K} + \frac{1}{h_{gas-}^K} * \frac{A_{ave}^K}{A_{in}^K}},$$

where, $h_{ext}$, is the convection coefficient of the gas flowing outside the component, $T_{solid}^K$, is the temperature of the component, $K_{solid}^K$, is the conduction co-efficient, efficient, $h_{gas-}^K$, is the heat transfer of the gas flowing through the component, $A_{ave}^K$, is the average cross-sectional area of the component, $A_{in}^K$, is the cross-sectional area of the inlet of the component and $A_{out}^K$ is the cross-sectional area of the outlet of the component. Similarly, $$h_{eff+} = \frac{1}{\frac{1}{h_{ext}} + \frac{T_{solid}^K}{K_{solid}^K} * \frac{A_{out}^K}{A_{ave}^K} + \frac{1}{h_{gas+}^K} * \frac{A_{ave}^K}{A_{in}^K}}.$$

Thus, the heat exchange, $\Delta q_{ex}^K$, is equivalent to $\Delta q_{ex}^K = h_{eff\_-}^K(T^K - T_{amb}) + h_{eff\_+}^K(T^K - T_{amb})$.

The control system 100 determines or estimates the temperature within each component based on the heat exchange (420). The control system 100 may define the heat exchange implicitly and determine or estimate the temperature. The rate of energy within the component is equivalent to the net flow of energy in and out of the component, $$\rho V C_p \frac{dT^K}{dt} = \Delta E_{net}^K,$$

where V is the volume, $\rho$ is density of the gas, and $C_p$, is the specific heat of the component, and the change in temperature, $$\frac{dT^K}{dt},$$

may be represented also as $T^K - T_{old}^K$. The control system 100 may define the energy balance for each component implicitly as $$\frac{\rho V C_p (T^K - T_{old}^K)}{\Delta t} = C_{p\_in} \dot{m}_{in} T^K - C_{p_{out}} \dot{m}_{out} T^{K+1} + \Delta \dot{q}_{ex}^k + \Delta \dot{q}_{H2O\_cond}^K,$$

where $\Delta q_{H2O\_cond}^K$ is the heat exchange of the formation of the condensation of water, $\dot{m}_{in}$ is the mass flow in, $\dot{m}_{out}$ is the mass flow out, $C_{p\_in}$ is the specific heat in, $C_{p\_out}$ is the specific heat out. The control system 100 uses the implicit definition of the energy balance to determine the temperature for each component using the matrix of linear equations, for example.

The control system 100 determines the water balance by summing all the excess water or condensation, $\Delta \dot{n}_{liquid}$, at each component (422). And then, the control system 100 controls the one or more actuators 112 based on the total pressure balance, the partial pressure balance, the energy balance and/or the water balance (424). Since the amount of each element and the partial pressures for each element at each component are known, the control system 100 may determine whether the ratio is less than a threshold ratio. If the ratio is less than the threshold ratio, the control system 100 may further open or partially open the injector 120 to increase the amount of hydrogen into the fuel cell stack 108. In some implementations, the control system 100 may increase the speed of the hydrogen pump 122 to increase the amount of hydrogen that is recirculated into the fuel cell stack 108 to maintain the ratio. In some implementations, the control system 100 may decrease the amount of non-hydrogen gas or water by opening or partially opening the purge valve 124 to release water out the exhaust to increase the ratio of hydrogen gas. The control system 100 may open the purge valve 124 when the speed of the hydrogen pump 122 reaches or exceeds a threshold speed. The threshold speed may be a maximum operating speed for the hydrogen pump 122 or a threshold speed to assist in maintaining the ratio.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A control system for controlling a flow of gas through a fuel cell stack of a vehicle, comprising:
   a plurality of components that provide the gas to the fuel cell stack and that include a first component and a second component that is upstream of the first component; and
   an electronic control unit connected to the plurality of components and configured to:
   determine a first value corresponding to a flowrate, a pressure, a concentration, a temperature or a liquid water quantity of the gas within the first component and a second value corresponding to a flowrate, a pressure, a concentration, a temperature or a liquid water quantity of the gas within the second component that is upstream of the first component,
   determine or estimate a total pressure of the gas within the first component based on the first value and the second value, and
   control one or more actuators based on the total pressure of the gas within the first component.

2. The control system of claim 1, wherein the gas is a composition of hydrogen gas, water and non-hydrogen gas.

3. The control system of claim 1, wherein the one or more actuators include an injector, a hydrogen pump or a purge valve, wherein the injector controls an amount or rate of hydrogen gas injected into the fuel cell stack, wherein the hydrogen pump controls the amount or the rate of the hydrogen gas that is recirculated into the fuel cell stack, wherein the purge valve controls an amount or rate of non-hydrogen gas exhausted from the vehicle.

4. The control system of claim 1, wherein the electronic control unit is configured to determine or estimate a partial pressure of an element of the gas within the first component.

5. The control system of claim 1, wherein to control the one or more actuators the electronic control unit is configured to:
   determine a ratio of an amount of hydrogen gas injected into the fuel cell stack to an amount of hydrogen gas consumed by the fuel cell stack; and
   adjust a speed of a hydrogen pump based on the ratio.

6. The control system of claim 5, wherein to control the one or more actuators the electronic control unit is further configured to:
   adjust a position of a purge valve to release at least one of water or non-hydrogen gas based on the speed of the hydrogen pump.

7. The control system of claim 1, wherein to control the one or more actuators the electronic control unit is configured to:
   adjust at least one of an injector, a hydrogen pump or a purge valve to maintain a ratio of moles of hydrogen gas injected into the fuel cell stack to moles of hydrogen gas consumed by the fuel cell stack when pressure of the gas at the fuel cell stack is constant.

8. The control system of claim 1, wherein to control the one or more actuators the electronic control unit is configured to:

adjust a position of an injector to allow an amount of hydrogen gas into the fuel cell stack that is greater than or equal to an amount of hydrogen gas consumed by the fuel cell stack to generate electrical energy.

9. The control system of claim 1, wherein the electronic control unit is configured to:
determine a water balance within the first component; and
control the one or more actuators based on the water balance.

10. A method for controlling a flow of gas within a fuel cell, comprising:
obtaining a first value corresponding to a flowrate, a pressure, a concentration, a temperature or a liquid water quantity of the gas within a first component and a second value corresponding to a flow rate, a pressure, a concentration, a temperature or a liquid water quantity of the gas within a second component that is upstream of the first component;
determining a total pressure of the gas within the first component based on the first value and the second value;
determining a partial pressure of an element of the gas within the first component; and
controlling at least one of an injector, a purge valve or a hydrogen pump to maintain a ratio of moles of hydrogen gas into the fuel cell to moles of hydrogen gas consumed by the fuel cell based on the total pressure of the gas and the partial pressure of the element of the gas within the first component.

11. The method of claim 10, further comprising:
determining a water balance by summing all excess water or condensation from each component of a plurality of components that provide the gas to the fuel cell and including the first component and the second component.

12. The method of claim 10, wherein controlling the at least one of the injector, the purge valve or the hydrogen pump includes controlling a speed of the hydrogen pump based on a ratio of hydrogen gas to non-hydrogen gas.

13. The method of claim 12, wherein controlling the speed of the hydrogen pump includes increasing the speed of the hydrogen pump to increase an amount of hydrogen gas entering into the fuel cell to maintain the ratio of the moles of hydrogen gas into the fuel cell to the moles of hydrogen gas consumed by the fuel cell.

14. The method of claim 12, wherein controlling the at least one of the injector, the purge valve or the hydrogen pump further includes controlling a position of the purge valve based on the speed of the hydrogen pump.

15. The method of claim 14, further comprising:
determining that the speed of the hydrogen pump is greater than or equal to a threshold level; and
moving the purge valve to an open or partially open position to release or exhaust water out.

16. The method of claim 10, further comprising:
determining a heat transfer coefficient of the gas, a component wall and an exterior of the first component; and
determining a temperature within the first component based on the heat transfer coefficient of the gas, the component wall and the exterior of the first component;
wherein determining the total pressure of the first component is further based on the temperature.

17. The method of claim 10, further comprising:
determining an amount of liquid water that has been separated from the gas or has accumulated within components of the fuel cell;
wherein controlling the at least one of the injector, the purge valve or the hydrogen pump includes controlling the purge valve based on the amount of liquid water.

18. A control system for controlling a flow of gas within a fuel cell stack of a vehicle, comprising:
a plurality of components including a first component and a second component that is upstream of the first component; and
an electronic control unit connected to the plurality of components and configured to:
determine a first value corresponding to a flowrate, a pressure, a concentration, a temperature or a liquid water quantity of the gas within the first component and a second value corresponding to a flowrate, a pressure, a concentration, a temperature or a liquid water quantity of the gas within the second component that is upstream of the first component,
determine a total pressure of the gas within the first component based on the first value and the second value,
determine a partial pressure of elements of the gas within the first component based on the total pressure,
determine a temperature within the first component,
determine a water balance within the first component, and
control one or more actuators based on the total pressure, the partial pressure, the temperature and the water balance.

19. The control system of claim 18, wherein to control the one or more actuators the electronic control unit is configured to:
determine a ratio of an amount of hydrogen gas into the fuel cell stack to an amount of hydrogen consumed by the fuel cell stack, and
adjust a speed of a hydrogen pump based on the ratio.

20. The control system of claim 19, wherein to control the one or more actuators the electronic control unit is further configured to:
adjust a position of a purge valve to release at least one of water or non-hydrogen gas based on the speed of the hydrogen pump.

* * * * *